US009416526B2

(12) United States Patent
Goff

(10) Patent No.: US 9,416,526 B2
(45) Date of Patent: *Aug. 16, 2016

(54) SEWER CLEANOUT LEVEL INDICATOR

(71) Applicant: William T. Goff, Conway, SC (US)

(72) Inventor: William T. Goff, Conway, SC (US)

( * ) Notice: Subject to any disclaimer, the term of this patent is extended or adjusted under 35 U.S.C. 154(b) by 205 days.

This patent is subject to a terminal disclaimer.

(21) Appl. No.: 14/224,035

(22) Filed: Mar. 24, 2014

(65) Prior Publication Data

US 2014/0202375 A1 Jul. 24, 2014

Related U.S. Application Data

(63) Continuation-in-part of application No. 13/345,174, filed on Jan. 6, 2012, now Pat. No. 8,677,923.

(51) Int. Cl.
*G01F 23/58* (2006.01)
*G01F 23/30* (2006.01)
*E03F 7/00* (2006.01)
*G01F 23/60* (2006.01)

(52) U.S. Cl.
CPC . *E03F 7/00* (2013.01); *G01F 23/58* (2013.01); *G01F 23/603* (2013.01)

(58) Field of Classification Search
CPC ......... G01F 23/30; G01F 23/56; G01F 23/58; G01F 23/64; G01F 23/66
USPC ............ 116/109, 110, 227, 228; 73/305, 307, 73/319, 322, 322.5; 137/556, 558, 559
See application file for complete search history.

(56) References Cited

U.S. PATENT DOCUMENTS

| 1,158,395 | A | * | 10/1915 | Stephen | E03D 1/34 251/358 |
| 1,489,957 | A | | 4/1924 | Morton | |
| 2,761,037 | A | | 8/1956 | Thomas et al. | |
| 3,166,041 | A | * | 1/1965 | Caggainello | B65D 90/48 116/173 |
| 3,407,660 | A | * | 10/1968 | Nusbaum | G01F 23/58 73/311 |
| 3,926,143 | A | * | 12/1975 | Hothan | G01F 23/58 116/228 |
| 3,954,612 | A | * | 5/1976 | Wilkerson | G01F 23/58 116/228 |
| 3,960,107 | A | | 6/1976 | McCloskey | |
| 4,059,985 | A | * | 11/1977 | Kelly | G01M 3/025 116/228 |
| 4,321,590 | A | * | 3/1982 | Ishikawa et al. | G01F 23/74 340/515 |
| 4,546,346 | A | | 10/1985 | Wave et al. | |
| 4,973,950 | A | | 11/1990 | Tourtillott | |
| 5,687,761 | A | | 11/1997 | Langes | |
| 5,862,775 | A | | 1/1999 | Stroud | |
| 5,909,825 | A | * | 6/1999 | Lydford | B67D 1/1245 116/110 |

(Continued)

FOREIGN PATENT DOCUMENTS

FR 2916845 A1 * 12/2008 ............. G01F 23/60

*Primary Examiner* — Richard A Smith
(74) *Attorney, Agent, or Firm* — P. Jeff Martin; The Law Firm of P. Jeffrey Martin, LLC

(57) ABSTRACT

A sewer cleanout level indicator for use with a retrofitted conventional sewer cleanout cap. The indicator provides a visual indication of whether a sewer lateral line is blocked on the residential or private side, or the government side. The indicator includes an elongated tubular member which is slidably received by the retrofitted conventional sewer cleanout cap. The tubular member has an upper end having a circular cap attached thereto. The circular cap has a flexibly-compressible annular flange contiguously carried therebelow. A bulbous float is fixedly attached to the lower end of the tubular member. The float is responsive to a change in a level of fluid or waste water present within the cleanout riser of a conventional sewer lateral line.

17 Claims, 4 Drawing Sheets

(56) References Cited

U.S. PATENT DOCUMENTS

| | | | | |
|---|---|---|---|---|
| 6,147,614 A * | 11/2000 | Parish | G08B 21/20 | 340/618 |
| 6,440,304 B2 * | 8/2002 | Houck et al. | C02F 1/285 | 210/282 |
| 6,786,091 B1 * | 9/2004 | Aleali | G01F 23/30 | 73/305 |
| 7,284,422 B1 * | 10/2007 | Thompson | G01C 13/004 | 73/170.29 |
| 7,334,536 B2 | 2/2008 | Aniban, Jr. | | |
| 7,430,907 B2 * | 10/2008 | Summer et al. | H01M 10/484 | 73/447 |
| 7,617,725 B2 * | 11/2009 | Howayshell | G01F 23/60 | 73/308 |
| 8,508,382 B1 * | 8/2013 | Novak | B63C 11/26 | 114/329 |
| 8,677,923 B2 * | 3/2014 | Goff | G01F 23/58 | 116/228 |
| 2003/0051655 A1 * | 3/2003 | Broyles | G01F 23/56 | 116/110 |
| 2006/0151362 A1 * | 7/2006 | Grotenrath | C02F 3/006 | 210/86 |
| 2010/0000317 A1 * | 1/2010 | Bron et al. | A47J 27/2105 | 73/313 |
| 2013/0305441 A1 * | 11/2013 | Williamson et al. | E03F 7/04 | 4/219 |

\* cited by examiner

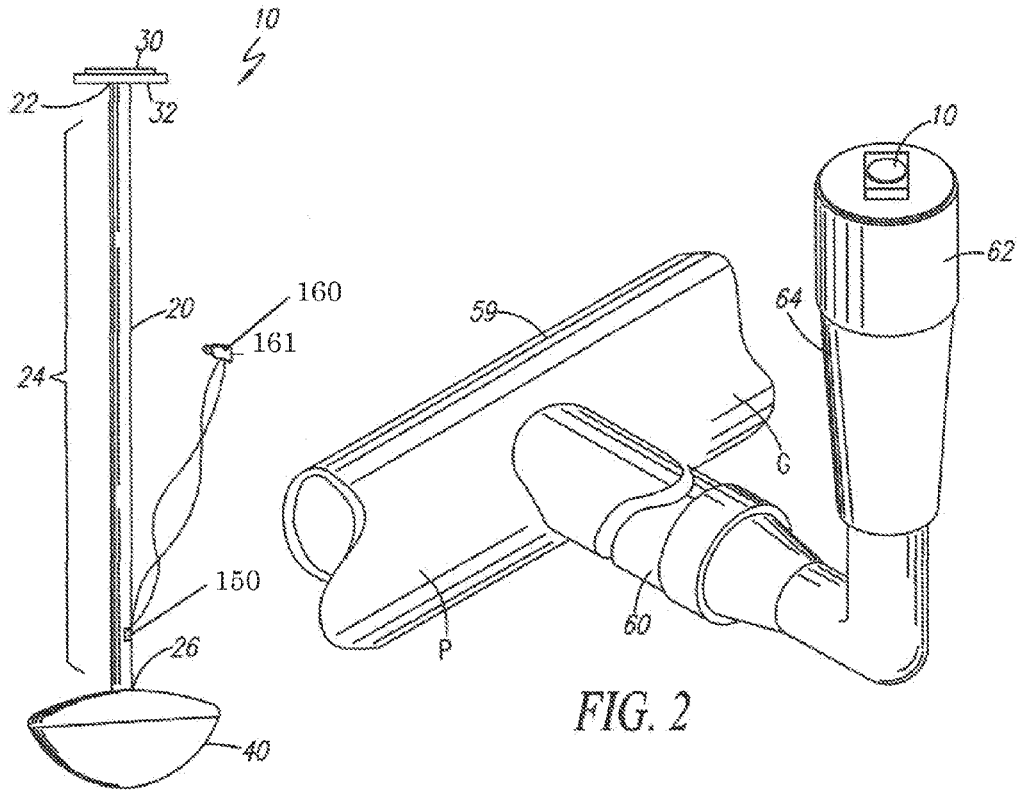
FIG. 1
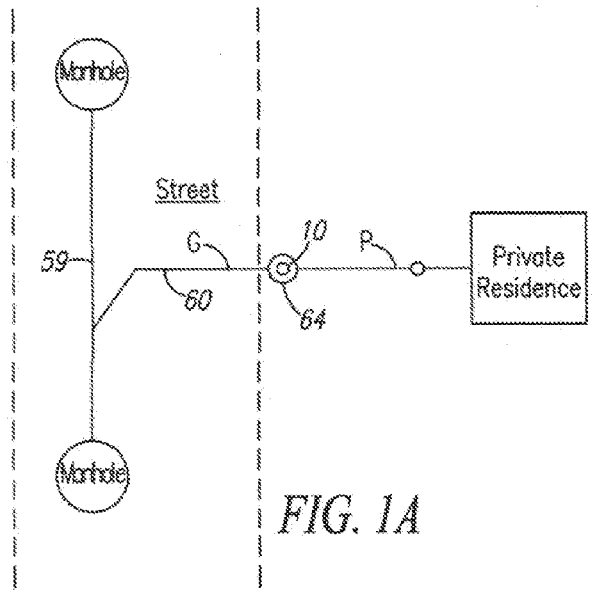
FIG. 1A
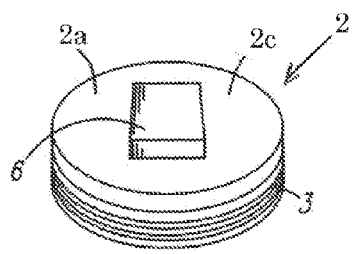
FIG. 2
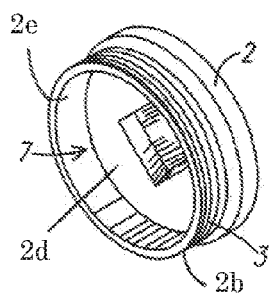
FIG. 3
FIG. 4

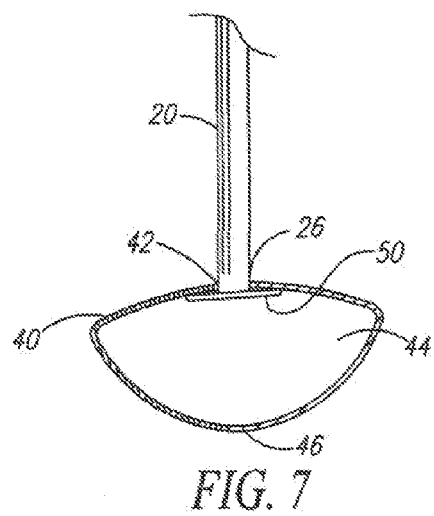
FIG. 7
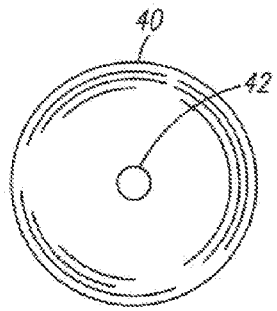
FIG. 5
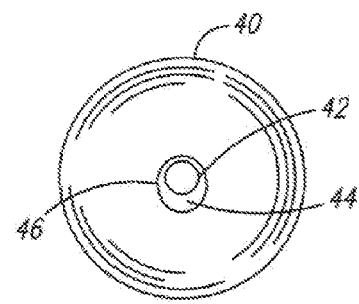
FIG. 6
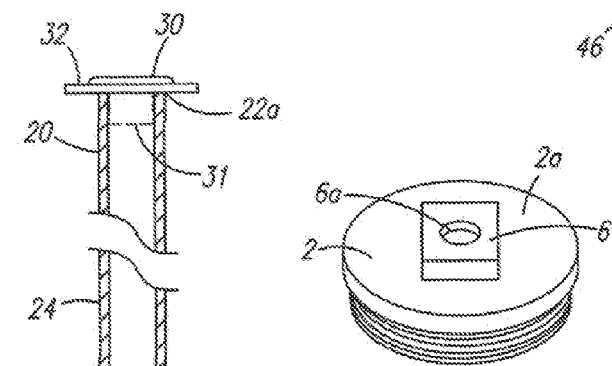
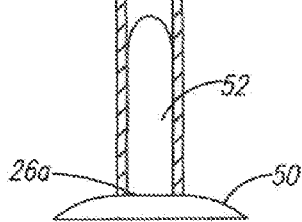
FIG. 7A
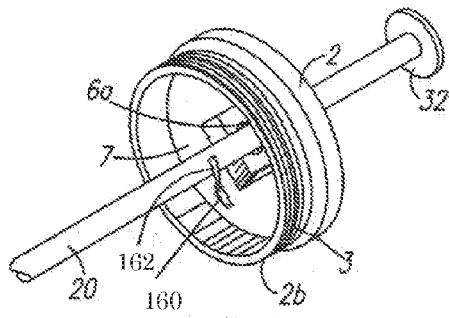
FIG. 9
FIG. 8

SEWER CLEANOUT LEVEL INDICATOR

RELATED APPLICATIONS

The present application is a Continuation-in-Part of application Ser. No. 13/345,174, filed on Jan. 6, 2012.

BACKGROUND OF THE INVENTION

1. Field of the Invention

The present invention relates generally to devices for measuring liquid levels in tanks and sewer backup indicator devices, and more particularly, to a sewer cleanout indicator for use with a retrofitted conventional sewer cleanout cap.

2. Description of the Related Art

Currently there exist in the art various devices and indicators for measuring liquid levels in tanks and sewage systems. However, the prior art has failed to disclose or teach a sewer cleanout level indicator for use with a retrofitted conventional sewer cleanout cap, wherein the indicator is adapted and configured to provide a visible indication of whether a sewer lateral line is in a surcharged condition, or whether the sewer lateral line is in a non-surcharged condition.

Accordingly, a need exists for a sewer cleanout level indicator adapted and configured to be slidably received by a retrofitted conventional sewer cleanout cap of a conventional sewer lateral line. The development of the sewer cleanout level indicator fulfills this need.

A search of the prior art did not disclose any patents that read directly on the claims of the instant invention; however, the following references were considered related:

U.S. Pat. No. 5,687,761, issued in the name of Langes;
U.S. Pat. No. 7,334,536 B2, issued in the name of Aniban, Jr.;
U.S. Pat. No. 5,862,775, issued in the name of Stroud;
U.S. Pat. No. 2,761,037, issued in the name of Thomas et al.;
U.S. Pat. No. 3,960,107, issued in the name of McCloskey;
U.S. Pat. No. 1,489,957, issued in the name of Morton;
U.S. Pat. No. 3,407,660, issued in the name of Nusbaum;
U.S. Pat. No. 4,546,346, issued in the name of Wave et al.; and
U.S. Pat. No. 4,973,950, issued in the name of Tourtillott.

Consequently, a need has been felt for a sewer cleanout level indicator for use with a retrofitted conventional sewer cleanout cap, the indicator providing visual indication of whether a sewer lateral line is blocked on the residential or private side, or the government side in a manner which is quick, easy, and cost-efficient.

This application presents claims and embodiments that fulfill a need or needs not yet satisfied by the products, inventions and methods previously or presently available. In particular, the claims and embodiments disclosed herein describe a sewer cleanout level indicator, the indicator comprising: a flexible, elongated tubular member; the tubular member being slidably received by a sewer cleanout cap; a planar, circular cap; a flexibly-compressible annular flange; an illuminating device; and a bulbous float, the float being responsive to a change in the level of fluid present within a cleanout riser of a sewer lateral line, the indicator providing unanticipated and nonobvious combination of features distinguished from the products, inventions and methods preexisting in the art. The applicant is unaware of any product, method, disclosure or reference that discloses the features of the claims and embodiments disclosed herein.

SUMMARY OF THE INVENTION

Briefly described according to one embodiment of the present invention, a sewer cleanout level indicator is disclosed. The indicator is adapted and configured to be slidably received by a retrofitted conventional sewer cleanout cap of a conventional sewer lateral line. The indicator is further adapted and configured to provide a visible indication of whether a sewer lateral line is either backed-up or in a "surcharged condition", or whether the sewer lateral line is operating properly (contains no blockage) or in a "non-surcharged condition". Thus, in the event user experiences plumbing or sewer line back-up, and the indicator indicates a surcharged condition, back-up or blockage lies on the government side of the sewer line system. In contrast, in the event user experiences plumbing or sewer line back-up, and the indicator indicates a non-surcharged condition, back-up or blockage lies on the private side of the sewer line system.

The indicator comprises a flexible, elongated tubular member having an upper end, a lower end, and a body portion. The upper end of tubular member includes a circular cap attached thereto, the circular cap having and a flexibly-compressible annular flange contiguously carried therebelow.

The indicator further comprises a bulbous float fixedly attached to the lower end of tubular member. The float is responsive to a change in a level of fluid or waste water present within the cleanout riser of a typical or conventional sewer lateral line.

An illuminating device is provided for enhancing visibility of the indicator at night, dawn or dusk, or in difficult or adverse weather conditions such as rain, fog, or snow.

During a surcharged condition, the float rises in response to waste fluid rising upward through cleanout riser which causes tubular member to rise upwardly through sewer cleanout cap to a vertically-elevated position, the vertically-elevated tubular member providing visible indication that sewer lateral line is backed-up. And more specifically, the sewer lateral line is backed-up on the government side of the sewer lateral line.

During a non-surcharged condition, the tubular member rests in a downward position within the cleanout riser and the annular flange of tubular member seats snugly atop the sewer cleanout cap covering the hole thereof, thereby shielding sewer cleanout cap from environmental elements, articles, and debris. While in a downward, resting position, if sewer blockage exists, the tubular member provides visible indication that the back-up exists on the private side of the sewer lateral line.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1 is a side elevational view of a sewer cleanout level indicator, according to one embodiment of the present invention;

FIG. 1A is a block diagram of a conventional sewer line system;

FIG. 2 is a partial perspective view of the sewer cleanout level indicator shown in-use with a retrofitted sewer cleanout cap, the indicator indicating the sewer lateral line is currently in a non-surcharged condition;

FIG. 3 is a top perspective view of a conventional sewer cleanout cap;

FIG. 4 is a bottom perspective view of the sewer cleanout cap of FIG. 3;

FIG. 5 is a top plan view of the float, in accordance to one embodiment of the present invention;

FIG. 6 is a bottom plan view of the float of FIG. 5;

FIG. 7 is a cross-sectional view of the float illustrating the hollow interior thereof, in accordance to one embodiment of the present invention;

FIG. 7A is partial cross-sectional view of the tubular member, in accordance to one embodiment of the present invention;

FIG. 8 is a top perspective view of a conventional sewer cleanout cap shown retrofitted with a hole, in accordance to one embodiment of the present invention;

FIG. 9 is a bottom perspective view of the retrofitted sewer cleanout cap of FIG. 8 showing the hole of cap slidably receiving the tubular member, in accordance to one embodiment of the present invention;

DESCRIPTION OF THE PREFERRED EMBODIMENT

Detailed Description of the Figures

Figure 7B:
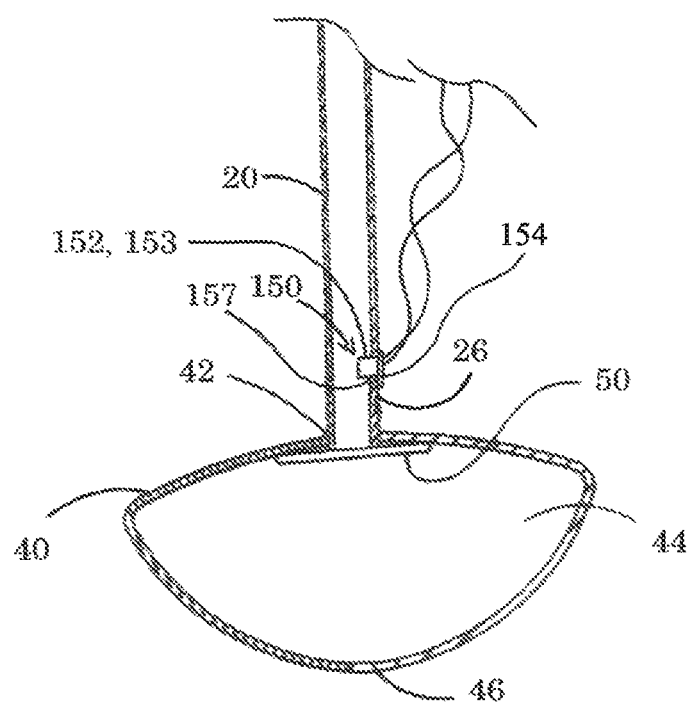
FIG. 7B is cross-sectional view of the tubular member illustrating the illuminating device installed therein, in accordance to one embodiment of the present invention.

Referring now to FIGS. 1-2, a sewer cleanout level indicator 10 is shown, according to one embodiment of the present invention, the sewer cleanout level indicator 10, hereinafter "indicator 10", is adapted and configured for use with a retrofitted conventional sewer cleanout cap 2. The indicator 10 provides a visual indication of whether a sewer lateral line 60 is blocked on the residential or private side P, or the government (e.g., city, municipality) side G.

In reference to FIG. 1A, a block diagram of a conventional sewer line system is provided, wherein a sewer main line 59 branches into a sewer lateral line 60, the sewer lateral line 60 is coupled to and in fluid communication with a cleanout riser 64.

Referring now to FIGS. 3-4, a conventional sewer cleanout cap 2 is provided with threads 3 for threadedly engaging a sewer cleanout cap housing 62, the housing 62 coupled to and in fluid communication with a cleanout riser 64 of a conventional sewer lateral line 60 coupled to and in fluid communication with a conventional sewer main line 59. A top 2a of the cap 2 may comprise numerous configurations for application of a tool. For example, a conventional sewer cleanout cap 2 may include a top 2a defining a generally flat upper surface 2c opposing a generally flat lower surface 2d, the upper surface 2c having a geometrically-shaped recess, such as square or hexagonal, a narrow, elongated recess for accepting the blade of a tool such as a flathead screwdriver, a cross-shaped recess for accepting a Phillips-type screwdriver or similar tool, or a hollow, upwardly projecting square boss 6 or similar extension for the application of a wrench. Thus, the sewer cleanout cap 2 illustrated herein is for exemplary purposes only and is not intended to be limiting.

The conventional sewer cleanout cap 2 further typically includes a partially hollow interior. A bottom 2b of cap 2 includes an externally threaded, circular wall 3 forming a lower cavity 7, wherein the lower cavity 7 being defined by the generally flat lower surface 2d portion and an internal circumferential surface 2e opposing the threaded surface of externally threaded, circular wall 3.

Referring now more specifically to FIGS. 1, 2, and 5-7, the indicator 10 comprises a flexible, elongated tubular member 20 having an upper end 22, a lower end 26, and a body portion 24. The upper end 22 and lower end 26 may each be defined as having an opening 22a and 26a, respectively, the body portion 24 may define a longitudinally-extending open interior 24a, and wherein the upper end 22 being in direct fluid communication with the lower end 26 via the open interior 24a. The tubular member 20 is constructed of a flexibly-bendable, returnably resilient material having a bending resistance sufficient to flexibly bend when subjected to repeated forces and flexibly return to its original, elongated configuration upon removal of such forces, and leaving tubular member 20 in an undamaged, fully operable state. Forces may include, e.g., a tire of a motor vehicle, the foot of a person, or other object which may foreseeably contact tubular member 20. In addition, being constructed of a flexibly-bendable, returnably resilient material, the tubular member 20 leaves objects or persons which contact or apply a force thereto in an undamaged or unharmed condition. For example, in the event a motor vehicle tire runs over tubular member 20, as the tire is removed from atop tubular member 20, tubular member 20 flexibly rises to its original, elongated configuration and during such process, tubular member 20 may contact the motor vehicle. Should tubular member 20 contact the motor vehicle during its vertical ascension, the motor vehicle will be free of any damage, e.g., scratches, dents, and the like.

A planar, circular cap 30 is centrally affixed or molded integral to the upper end 22 of tubular member 20. The tubular member 20 comprises a length measuring approximately between 25.4 cm and 38.1 cm, and preferably measuring approximately 33.0 cm. The tubular member 20 comprises a diameter measuring approximately between 0.5 cm and 2.5 cm, and preferably measuring approximately 1.0 cm.

A flexibly-compressible annular flange 32 is disclosed, wherein annular flange 32 is coaxially attached to tubular member 20 contiguous to a lower surface of the circular cap 30. The annular flange 32 comprises a diameter measuring equal to or greater than a diametric measure defining the circular cap 30.

In accordance to one embodiment, the planar, circular cap 30 may include a plug portion 31 molded integral thereto (FIG. 7A). The plug portion 31 extends downward vertically from a center of the lower surface of circular cap 30. The annular flange 32 slidably receives the plug portion 31 in a mating fashion, the annular flange 32 is seated against a lower surface of circular cap 30. The plug portion 31 of circular cap 30 is then inserted longitudinally through the upper end 22 opening 22a of tubular member 20 and into the open interior 24a thereof until the lower surface of annular flange 32 engages the upper end 22 of tubular member 20 and plug portion 31 is held securely to tubular member 20 via mechanical interference, and thereby coupling circular cap 30 to upper end 22 of tubular member 20.

A bulbous float 40 is provided having a hollow interior 44. The bulbous float 40 is fixedly attached to the lower end 26 of tubular member 20. The float 40 is further defined as being flexibly pliable and returnably resilient, wherein float 40 being responsive to a change in a level of fluid 67 or waste water (shown in FIG. 10) present within the cleanout riser 64 of a typical or conventional sewer lateral line 60.

In accordance to one embodiment, the float 40 may include a small diameter aperture 42 defined centrally through the upper, external circumferential surface thereof, and a large diameter aperture 46 defined centrally through the lower, external circumferential surface of float 40, the small diameter aperture 42 being linearly aligned and in fluid communication with the large diameter aperture 46. The small diameter aperture 42 defines a diameter measuring less than a diameter defining tubular member 20. The small diameter aperture 42 and the large diameter aperture 46 each providing direct passage into the hollow interior 44 of float 40. The bulbous float 40 may be fixedly attached to the lower end 26 of tubular member 20 by inserting the lower end 26 longitudinally through the small diameter aperture 42 a limited longitudinal distance. The bulbous float 40 is held fixedly to tubular member 20 via mechanical interference or frictional impingement.

A planar, circular end cap 50 is centrally affixed or molded integral to the lower end 26 of tubular member 20. The end cap 50 defines a diameter measuring greater than a diameter measure of the small diameter aperture 42.

In particular reference to FIG. 7A, in accordance to one embodiment of the present invention, the planar, circular end cap 50 may include a bougie 52 molded integral thereto. The bougie 52 extends vertically from a center of an upper surface of end cap 50.

In order to fixedly secure circular end cap 50 to the lower end 26 of tubular member 20, the bougie 52 of cap 50 is inserted through the large diameter aperture 46, through hollow interior 44, and through small diameter aperture 42 of float 40. The bougie 52 portion of end cap 50 is next inserted longitudinally through the lower end 26 opening 26a of tubular member 20 and into the open interior 24a thereof until the upper surface of end cap 50 engages the lower end 26 of tubular member 20 and bougie 52 is held securely to tubular member 20 via mechanical interference, and thereby coupling end cap 50 to lower end 26 of tubular member 20.

The lower end 26 of tubular member 20 may next be inserted longitudinally through the small diameter aperture 42 a limited longitudinal distance. Tubular member 20 may be slidably pulled slightly upward until an upper surface of end cap 50 engages an inner circumferential surface portion extending radially from small diameter aperture 42 so as to allow end cap 50 to be seated thereagainst, and thereby placing the present invention in a pre-operational position. As previously described, because tubular member's 20 diameter measures greater than a diameter measure of small diameter aperture 42, the float 40 is frictionally held to tubular member 20 in the pre-operational position. The end cap 50 functions to ensure or enhance secured attachment by float 40 to the lower end 26 of tubular member 20.

Referring now more specifically to FIGS. 1, 2 and 8-9, in order to install the indicator 10 for retrofit use with a conventional sewer cleanout cap 2, a hole 6a is drilled centrally through cleanout cap 2 (shown for exemplary purposes only herein as the square boss 6 of cleanout cap 2). The hole 6a is dimensioned for slidably receiving tubular member 20. As shown in FIG. 8, the hole 6a is drilled through the upper, horizontal wall portion of the square boss 6. The annular flange's 32 diameter measures greater than a diametric measure defining the hole 6a, thus, during a non-surcharged condition, flange 32 shields the sewer cleanout cap 2 from environmental elements (as will be described later in greater detail).

Prior to fixed attachment of circular cap 30 and annular flange 32 to the upper end 22 of tubular member 20, the upper end 22 of tubular member 20 is slidably inserted through the hole 6a from the bottom 2b side of cap 2. Next, annular flange 32 is fixedly attached to tubular member 20 and circular cap 30 is centrally affixed to the upper end 22 of tubular member 20 atop annular flange 32 in a manner such that annular flange 32 is oriented contiguous to a lower surface of circular cap 30.

With tubular member 20 slidably received by hole 6a, the lower end 26 of tubular member 20 with attached float 40 is lowered into the sewer cleanout cap housing 62 and into the cleanout riser 64. The retrofitted sewer cleanout cap 2 is screwed into the sewer cleanout cap housing 62, thus placing the indicator 10, and more specifically the tubular member 20, in a downward, resting position (illustrated in FIG. 2). While in a resting position, such as during a non-surcharged condition, the annular flange 32 seats contiguously atop the upper, horizontal wall portion of the square boss 6 covering the hole 6a thereof, thus preventing environmental elements, e.g., rain, dirt, and other articles such as debris, from entering the sewer cleanout cap 2.

Figure 10:
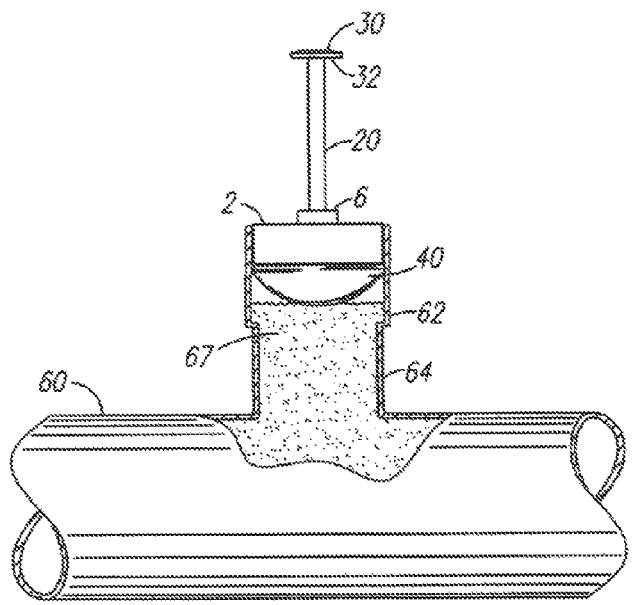
FIG. 10 is a partial cross-sectional view of the sewer cleanout level indicator shown in-use with a retrofitted sewer cleanout cap, the indicator indicating the sewer lateral line is currently in a surcharged condition.

Referring now to FIG. 10, in the event fluid 67 rises upwardly into the cleanout riser 64 ("surcharged condition"), the float 40 rises in response to the rising fluid 67, thereby causing tubular member 20 to rise through cleanout riser 64, and through sewer cleanout cap housing 62, hence providing a visible indication that sewer lateral line 60 is backed-up or in a surcharged condition. In the event fluid 67 rises through cleanout riser 64 to a level causing float 40 to engage the bottom 2b of sewer cleanout cap 2, the float 40 is configured to flexibly mold and conform to the shape and configuration of the lower cavity 7 of sewer cleanout cap 2, thereby forming a seal for sealing the bottom 2b of sewer cleanout cap 2 and preventing escape and discharge of sewer fluid 67 therethrough during a surcharged condition. Being responsive to the change in a level of fluid 67 present within a cleanout riser 64 of a sewer lateral line 60, float 40 maintains tubular member 20 in the upward extended position until the fluid 67 subsides or is removed from cleanout riser 64.

Significantly, when tubular member 20 is raised in an upwardly extended position, as shown in FIG. 10, the back-up or surcharged condition lies on the government side G of the sewer lateral line 60, and thus, back-up or blockage removal is the responsibility of the governmental entity.

In contrast, in the event an individual experiences sewer back-up in his/her residential plumbing, and the tubular member 20 is positioned in a downward, resting position, as shown in FIG. 2, the back-up exists on the private side P, and thus back-up or blockage removal is the responsibility of the homeowner.

Figure 11:
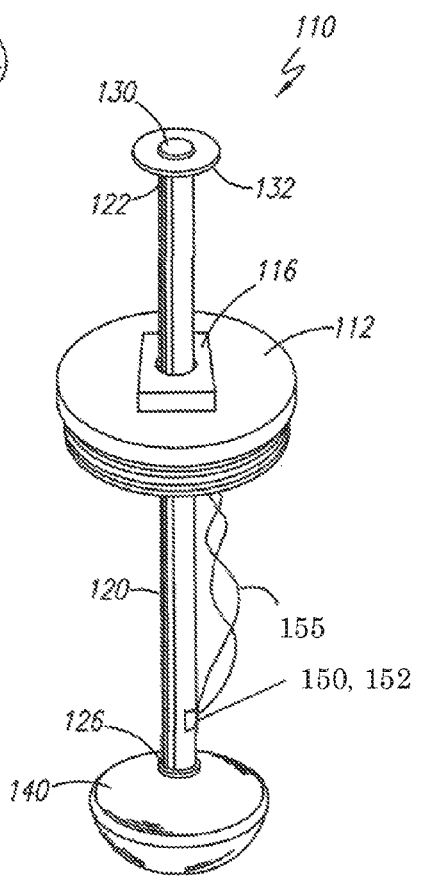
FIG. 11 illustrates an alternate embodiment of the present invention.

In reference to FIGS. 1-10, and more particularly to FIGS. 7B, 9, and 11, in accordance to one embodiment, the indicator 10 further comprises an illuminating device 150 for enhancing visibility of the indicator 10 at night, dawn or dusk, or in difficult or adverse weather conditions such as rain, fog, or snow. The illuminating device 150 comprises a light element 152 electrically connected via electrical wiring 155 or leads to a power supply unit 160, the power supply unit 160 supplying electrical power to the light element 152. The light element 152 comprises a light-emitting-diode (LED) 153 inserted perpendicularly substantially through an aperture 157 defined through the circumferential sidewall of the lower end 26 of the tubular member 20. The aperture 157 is dimensionally sized so that the LED 153 is firmly held therein via mechanical interferential fit. The LED 153 may comprise a base portion 154 for engaging an outer lip of the aperture 157 upon installation of the LED 153 in aperture 157 (as shown in FIG. 7B). The LED 153 is positioned so as to illuminate upwardly towards the upper end 22 of tubular member 20.

The power supply unit 160 is suitably coupled to the lower surface 2d of the cap 2. The power supply unit 160 comprises an automatic OFF/ON switch 161 actuated via removal of a contact strip 162. Removal of contact strip 162 functions as a switch signaling electrical contact by power supply unit 160 which then supplies electrical power to the LED 153 and activates illumination thereof.

The contact strip 162 further comprises an adhesive layer, wherein adhesive layer may be protected by a releasable liner. The releasable liner is removed from the strip 162, exposing the adhesive layer, and the strip 162 is attached proximate the upper end 22 of tubular member 20 via adhesive attachment of adhesive layer to tubular member 20.

Once the indicator 10 has been installed onto the retrofitted sewer cleanout cap 2 (as previously described), the cap 2 is screwed into the sewer cleanout cap housing 62, thus placing the indicator 10, and more specifically the tubular member 20, in a downward, resting position (illustrated in FIG. 2).

In the event fluid 67 rises upwardly into the cleanout riser 64 ("surcharged condition"), the float 40 rises in response to the rising fluid 67, thereby causing tubular member 20 to rise through cleanout riser 64, through sewer cleanout cap housing 62, and causing the contact strip 162 to be removed from the power supply unit 160, thereby activating illumination of the LED 153, and illuminating the tubular member 20.

In order to facilitate removal of contact strip 162 from power supply unit 160 upon upward rise of the float 40 (and hence tubular member 20) during a surcharged condition event, the contact strip 162 defines a measure of length being suitably short to allow the strip 162 to quickly tighten or become taut upon the rising of the tubular member 20. Otherwise, a strip 162 defining a length which remains relaxed upon maximum rise of the tubular member 20 would not activate removal of contact strip 162 from the power supply unit 160, and thus fail to actuate illumination of the light element 152.

The power supply unit 160 may also be suitably coupled to the internal circumferential surface 2e of cap 2.

The indicator 10 may comprise other means for indicating a sewer back-up condition which include, but are not limited to audible and tactile indicators.

Referring now to FIG. 11, in accordance to an alternate embodiment, a sewer cleanout level indicator 110 is provided. The sewer cleanout level indicator 110 comprises a flexible, elongated tubular member 120, a threaded sewer cleanout cap 112, and an illuminating device 150, the cleanout cap 112 for threadedly engaging a sewer cleanout cap housing 62 coupled to a cleanout riser 64 of a conventional sewer lateral line 60.

The tubular member 120 includes an upper end 122 having a planar, circular cap 130 and a flexibly-compressible annular flange 132 attached thereto. The tubular member 120 includes a lower end 126 carrying a bulbous float 140 being responsive to a change in a level of fluid 67 or waste water present within the cleanout riser 64 of a conventional sewer lateral line 60.

The cleanout cap 112 includes a hole 116 defined centrally therethrough, the hole 116 being dimensioned for slidably receiving tubular member 120.

For purposes of brevity and obviating redundancy, the tubular member 120, circular cap 130, annular flange 132, bulbous float 140, illuminating device 150, and retrofitted cleanout cap 130 comprise the same functional elements, features, and advantages associated with, and in accordance to the embodiments as previously described hereinabove. In addition, the alternate embodiment operates and functions in the same manner and in accordance to particular embodiments described earlier hereinabove.

It is envisioned that the various embodiments, as separately disclosed, are interchangeable in various aspects, so that elements of one embodiment may be incorporated into one or more of the other embodiments, and that specific positioning of individual elements may necessitate other arrangements not specifically disclosed to accommodate performance requirements or spatial considerations.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A sewer cleanout level indicator, the indicator comprising:
    a flexible, elongated tubular member, the tubular member comprising an upper end, a lower end, and a body portion;
    a planar, circular cap;
    a flexibly-compressible annular flange;
    a bulbous float; and
    an illuminating device.

2. The indicator of claim 1, wherein the circular cap is centrally affixed or molded integral to the upper end of the tubular member.

3. The indicator of claim 1, wherein the annular flange is coaxially attached to the tubular member, the annular flange is oriented contiguous to a lower surface of the circular cap.

4. The indicator of claim 3, wherein the annular flange seats contiguously atop an upper wall portion of a sewer cleanout cap during a non-surcharged condition or during periods in which a sewer lateral line is free of fluid blockage, thereby preventing environmental elements, articles, and debris from entering the sewer cleanout cap.

5. The indicator of claim 1, wherein the bulbous float is fixedly attached to the lower end of the tubular member.

6. The indicator of claim 5, wherein the float is flexibly pliable and returnably resilient, and wherein the float is responsive to a change in a level of a fluid present within a cleanout riser of a sewer lateral line.

7. The indicator of claim 6, wherein the float actuates the tubular member to slidably move through a sewer cleanout cap from a downward resting position to an upward extended position.

8. The indicator of claim 7, wherein the tubular member is oriented in a downward resting position during a non-surcharged condition, thus indicating a sewer line back-up lies on a private side of a sewer lateral line.

9. The indicator of claim 7, wherein the tubular member slidably moves through the sewer cleanout cap to an upward extended position during a surcharged condition, thus indicating a sewer line back-up lies on a government side of a sewer lateral line.

10. The indicator of claim 7, wherein the float engages a bottom of a sewer cleanout cap and flexibly molds and conforms to a shape and configuration of a lower cavity of the sewer cleanout cap, thereby forming a seal for sealing the bottom of the sewer cleanout cap and preventing escape and discharge of the fluid therethrough during a surcharged condition.

11. The indicator of claim 1, wherein the tubular member is slidably received by a sewer cleanout cap.

12. The indicator of claim 11, wherein the tubular member slidably moving from a downward resting position to an upward extended position in response to a rising level of a fluid present within a cleanout riser of a sewer lateral line.

13. The indicator of claim 1, further comprising a planar, circular end cap.

14. The indicator of claim 13, wherein the planar, circular end cap is centrally affixed or molded integral to the lower end of the tubular member.

15. A sewer cleanout level indicator, the indicator comprising:
   a flexible, elongated tubular member, the tubular member comprising an upper end, a lower end, and a body portion;
   a planar, circular cap;
   a flexibly-compressible annular flange;
   a bulbous float;
   an illuminating device; and
   a sewer cleanout cap, the cleanout cap detachably engaging a sewer cleanout cap housing coupled to a cleanout riser of a sewer lateral line.

16. The indicator of claim 15, wherein the tubular member is slidably received by the sewer cleanout cap.

17. The indicator of claim 16, wherein the cleanout cap includes a hole defined centrally therethrough, the hole being dimensioned for slidably receiving the tubular member.

* * * * *